Sept. 27, 1966  M. FERNANDEZ  3,274,829
AIRCRAFT INSTRUMENT
Filed June 3, 1963  5 Sheets-Sheet 1
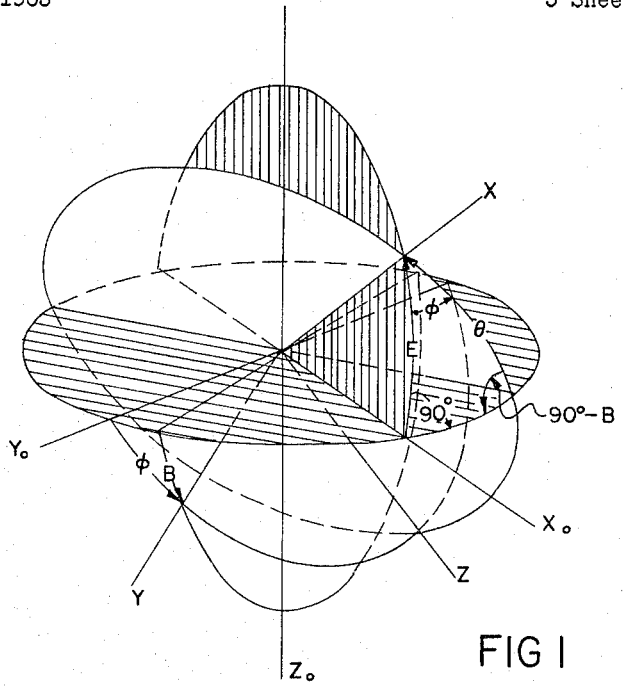
FIG 1
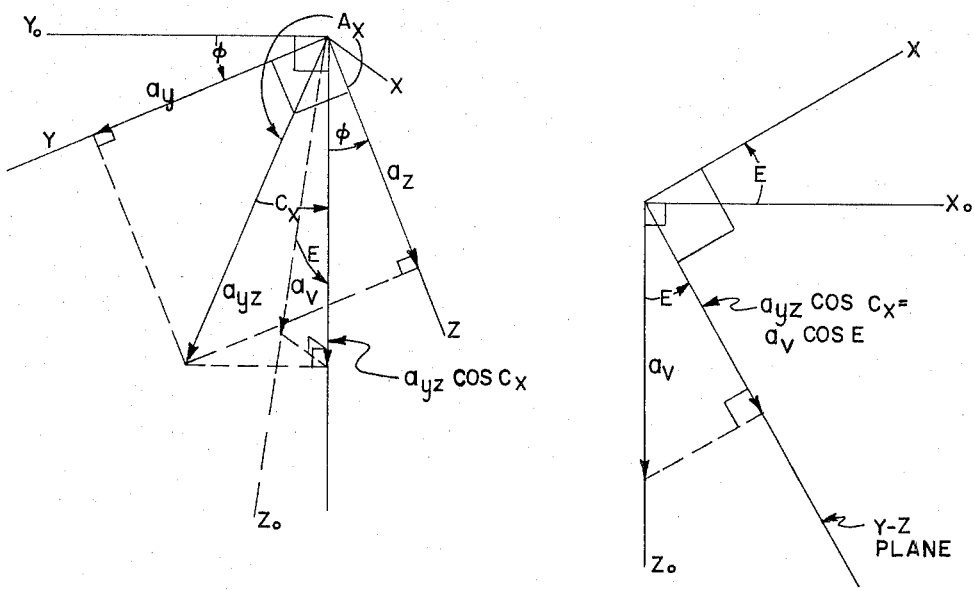
FIG 2
FIG 3
INVENTOR.
MANUEL FERNANDEZ
BY Roger W. Jensen
ATTORNEY

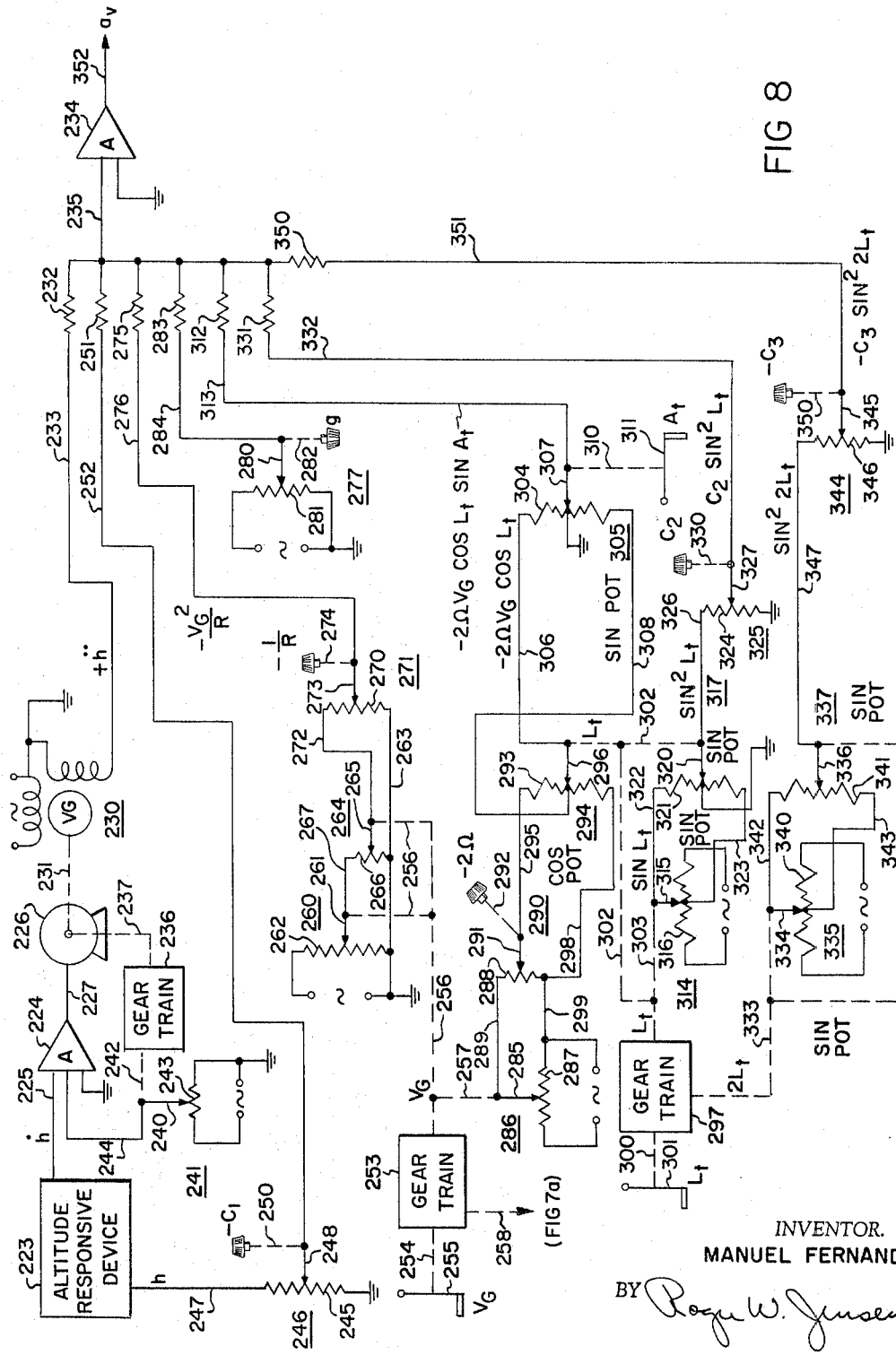

United States Patent Office 3,274,829
Patented Sept. 27, 1966

3,274,829
AIRCRAFT INSTRUMENT
Manuel Fernandez, Tampa, Fla., assignor to Honeywell
Inc., a corporation of Delaware
Filed June 3, 1963, Ser. No. 291,594
4 Claims. (Cl. 73—178)

This application is a continuation-in-part of a copending application, filed September 10, 1958, Serial Number 760,224, of the present inventor and assigned to the assignee of the present invention, now abandoned.

The present invention relates to aircraft instruments and more particularly to a vertical reference device for providing a true vertical reference.

In moving vehicles or aircraft, two general methods of providing a vertical reference have been to use a vertical seeking device and to use a horizontal seeking device which establishes a level reference by scanning the horizon. Vertical seeking devices, such as a pendulum or liquid level, are subject to errors caused by accelerations of the craft with respect to the earth, and also caused by the Coriolis acceleration due to the rotation of the earth. Horizon seeking devices, such as infrared energy scanners, are subject to errors due to irregularities in the horizon, and while these devices may reach an average value over a long period of time, they are subject to errors over short period durations. The errors of vertical seeking devices may be corrected by applying to the devices compensating forces which are equal and opposite to the forces that cause the vertical seeking device to depart from the true vertical. To generate these compensating forces instantaneous measurement of such quantities as the velocity of the craft, the acceleration of the craft, the angular velocity of the craft and the latitude may be required.

The present invention achieves a stable vertical reference by the use of three single-axis accelerometers, whose sensitive axes are mounted orthogonally in fixed relation to the vehicle, and apparatus for measuring the vertical acceleration of the vehicle or craft relative to the earth. By comparing the difference between the actual vertical acceleration measured, and the vertical acceleration components sensed by the accelerometers, the attitude of the accelerometer axes with respect to the earth is obtained.

The three accelerations are taken in pairs, one being in common to both pairs, and the resultants of the two pairs are computed together with the angles in the respective planes between the resultants and the common accelerations. The vertical components in their respective planes of the two resultants are also computed, as well as the angles between the resultants and their components. The components of the actual vertical acceleration on the two planes are also computed, and if these latter are not equal pairwise to the vertical components of the resultants, the last named angles are varied to make the pairs of components equal. When this is done the angular relation of the actual aircraft axes from normal local and from standard are readily computed.

It is therefore a general object of the present invention to provide a computer to calculate the attitude of a vehicle from the signals supplied by three orthogonally disposed single axis accelerometers and a vertical acceleration signal.

It is another object of the present invention to provide such a computer with compensating apparatus for correcting the vertical attitude information from the accelerometer axes so that the computer outputs are related to a predetermined reference.

It is yet another object of the present invention to provide a computer for furnishing information with respect to the attitude of the orthogonal axes of a vehicle or craft from inputs of acceleration only.

It is still another object of the present invention to provide a computer which computes a stable vertical reference without the filtering effect of gyroscopes.

Still another object of the present invention is to provide improved means for measuring the true vertical acceleration of a vehicle.

A further object of the present invention is to provide apparatus for controlling the precission rates of one or more filtering gyroscopes in accordance with the pitch attitude of the vehicle carrying them.

These and other features of the invention will be understood more clearly and fully from the following detailed description and accompanying drawings in which:

FIGURE 1 is a view of the several planes determined by the accelerometer axes in a level position, and in a second position showing a change of attitude;

FIGURES 2, 3, 4 and 5, are vector diagrams illustrative of the relationship among accelerations sensed by accelerometers positioned in accordance with FIGURE 1;

Figure 7A:
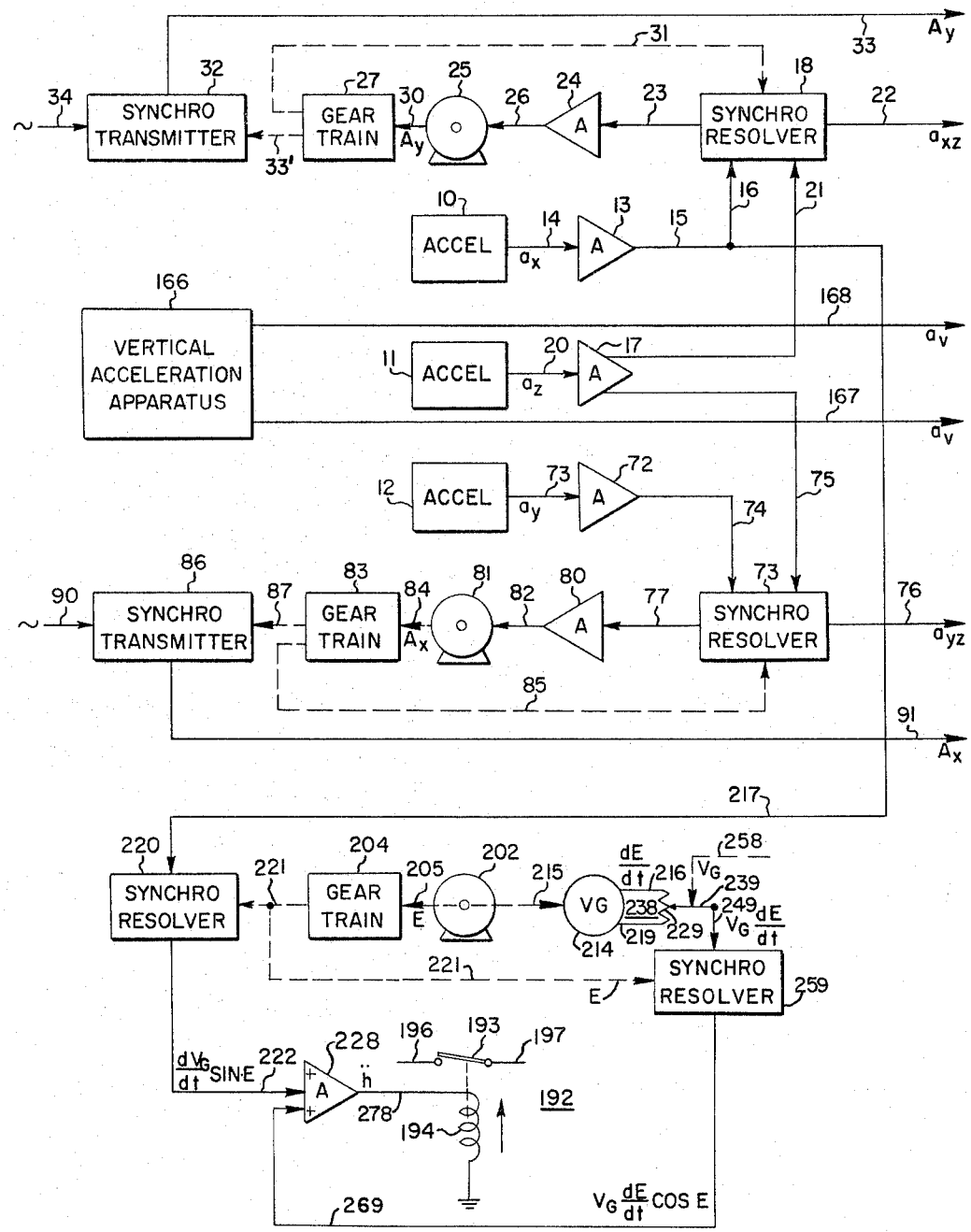
FIGURE 7A is a block diagram of the acceleration sensitive apparatus and erection cutoff apparatus.
Figure 7B:
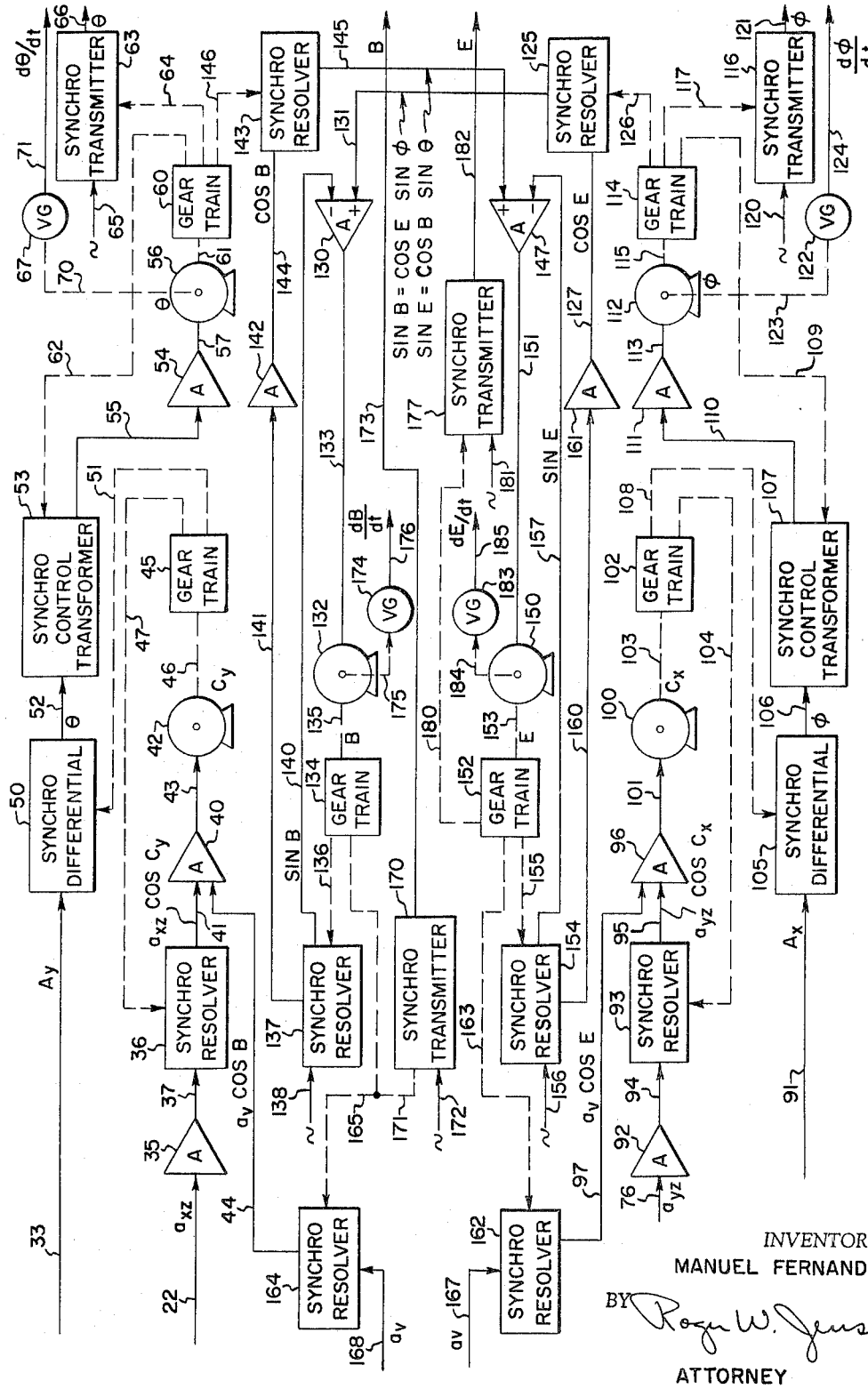
FIGURE 7B shows the computer used to compute the reference angles for indicating the attitude of the craft.

FIGURES 7A and 7B form the complete computer for determining the reference angles from accelerations only; and FIGURE 8 is a block diagram of the device utilized in measuring a true vertical acceleration.

FIGURE 1 shows a plurality of axes $X_0$, $Y_0$, and $Z_0$ which are mutually perpendicular. The plane determined by axes $X_0$ and $Y_0$ is defined as horizontal, and axis $Z_0$ is therefore vertical. For simplicity the $X_0$ axis may be considered as parallel to the roll axis of an aircraft in level flight, and the $Y_0$ and $Z_0$ axes as parallel to its pitch and yaw axes, respectively.

As the aircraft pitches so that its nose rises, the roll axis of the aircraft rotates about $Y_0$ through some angle E to a new position X. If the aircraft now rolls clockwise, to its right wing, the pitch axis rotates about X through some angle $\phi$ to a new position Y: the pitch angle also assumes a new value $\theta$, and the yaw axis has a new position Z. The angles B and E are the projections, of angles $\theta$ and $\phi$, on planes through Z, which contain axes Y and X respectively.

A spherical triangle is defined by the arcs E and $\theta$, which intersect on the axis, and a third arc defined by the horizontal plane. The spherical angle between arc E and the third arc is 90°, and the spherical angle between arcs E and $\theta$ is of magnitude $\phi$: the remaining angle of the spherical triangle can be shown to be of magnitude (90°−B). Then from the properties of spherical triangles $$\sin E = \cos B \sin \theta \qquad (1)$$

and $$\sin B = \cos E \sin \phi \qquad (2)$$

If three linear accelerometers are mounted in the aircraft so that their sensitive axes are aligned with its roll, pitch, and yaw axes, and the aircraft is allowed to attain a pitched and rolled attitude such as is shown in FIGURE 1, each accelerometer senses a component of acceleration. If further the aircraft is provided with means sensing the vertical acceleration $a_v$, parallel to axis $Z_0$, it becomes possible to determine the angles $\phi$, B, $\theta$, and E, as well as their rates of change. The relationships underlying this determination are illustrated in FIGURES 2–5, all based on FIGURE 1.

In FIGURE 2 accelerations along the Y and Z axes are shown by vectors $a_y$ and $a_z$: their resultant $a_{yz}$ makes an angle $A_x$ with respect to the Z axis. The vertical acceleration of the craft along the axis $Z_0$ is shown by the vector $a_v$. The intersection between the plane of axes Z and Y and the plane of axes X and $Z_0$ is a line on which the projections of $a_{yz}$ and $a_v$ are equal (see also FIGURE 3), and with which the vectors make the angles $C_x$ and E respectively: then $$a_{yz} \cos C_x = a_v \cos E \qquad (3)$$

and is at an angle $\phi$ with respect to $a_z$ in the X, Z plane.

Figure 4:
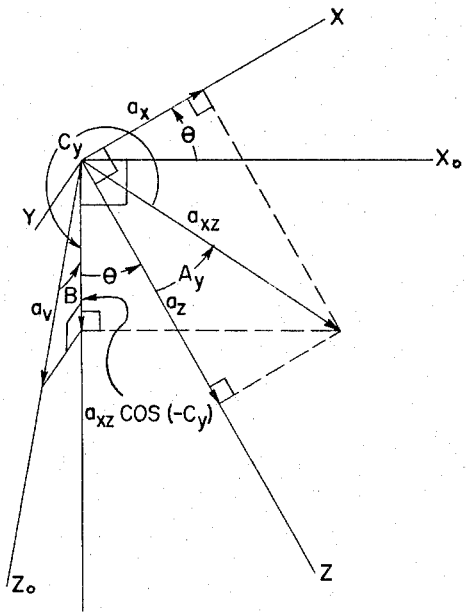

In FIGURE 4, accelerations along the X and Z axes are shown by vectors $a_x$ and $a_z$: their resultant $a_{xz}$ makes an angle A$y$ with respect to the Z axis. The vertical acceleration of the craft along the axis $Z_0$ is shown by the vector $a_v$. The intersection between the plane of axes X and Z and the plane of axes Y and $Z_0$ is a line on which the projections of $a_{xz}$ and $a_v$ are equal (see also FIGURE 5), and with which the vectors make the angles $C_y$ and B respectively: then $$a_{xz} \cos C_y = a_v \cos B \qquad (4)$$

and is at an angle $\theta$ with respect to $a_z$ in the YZ plane.

Apparatus based on the foregoing mathematical formulas will now be described, referring to FIGURES 7A and 7B. A first measuring means consisting of three linear accelerometers is shown in FIGURE 7A. The three linear accelerometers are identified by reference numerals 10, 11 and 12 and supply signals representative of accelerations $a_x$, $a_z$ and $a_y$ respectively. A signal representative of acceleration $a_x$ is sent to an amplifier 13 through a connecting lead 14: the signal is amplified and is used to excite one winding of a synchro resolver 18 through a pair of connecting leads 15 and 16. The $a_z$ signal received from accelerometer 11 is sent to an amplifier 17 through a connecting lead 20: the signal is amplified and used to excite another winding of resolver 18 through a connecting lead 21. Resolver 18 combines the $a_x$ and $a_z$ components as diagrammatically shown in FIGURE 4 and a resultant signal, which is the combination of the signals representative of $a_x$ and $a_z$ is produced as an output signal appearing on a connecting lead 22. Resolver 18 is of the type found in common usage and produces a pair of output signals on a pair of mutually perpendicular windings. The input has a pair of mutually perpendicular windings, each receiving a different signal and as the output rotor windings are rotated, the coupling is changed between the primary and secondary windings, or stationary and rotor windings, to change the magnitude of the output signals. The signal appearing on connecting lead 22 is representative of the trigonometric relationship $a_x \cos A_y + a_z \sin A_y$ and the signal appearing on connecting lead 23 is representative of $a_x \cos A_y - a_z \sin A_y$ and is zero when the shaft is set at the value $A_y$. The voltage present on connecting lead 23 is amplified in an amplifier 24 and is sent to a motor 25 through a connecting lead 26, causing the motor to rotate until the $a_x \cos A_y$ component magnitude equals the $a_z \sin A_y$ component magnitude, or stated in another way, the quantity $a_x \cos A_y - a_z \sin A_y$ is made equal to zero. This operation is generally described as a tangent solver where the quantity $a_x$ divided by $a_z$ equals the tangent of the angle $A_y$. Thus, motor 25 rotates a gear train 27 through a shaft 30 and gear train 27 in turn drives the rotor of resolver 18 through a connecting shaft 31 until the angle $A_y$ has been generated. In this fashion a signal representative of the resultant $a_{xz}$ is generated on lead 22 by the combining means consisting of resolver 18, amplifier 24, motor 25 and gear train 27. Gear train 27 also drives a synchro transmitter 32 through a connecting shaft 33 to provide an output signal indicative of angle $a_y$ on a connecting lead 33. Transmitter 32 is excited through a connecting lead 34.

The $a_{xz}$ signal appearing on connecting lead 22 is amplified by an amplifier 35 (FIGURE 7B) and used to excite a synchro resolver 36 through a connecting lead 37. Resolver 36 produces an output signal which is supplied to a comparing means, which in this preferred embodiment is an amplifier 40, through a connecting lead 41, and the amplifier output is used to drive a motor 42 through a connecting lead 43. A second signal is received at amplifier 40, through a connecting lead 44, which is representative of $a_v \cos B$, and is compared with the quantity $a_{xz} \cos C_y$: the difference between the two signals serves to drive motor 42 and thus gear train 45 through a connecting shaft 46. Motor 42 and gear train 45 comprise an adjusting means for adjusting the rotor of resolver 36 to the correct position. Resolver 36 has its rotor connected to gear train 45 by a connecting shaft 47 and the result is that motor 42 is driven until the angle $C_y$ is generated as is shown in FIGURE 4. As shown in FIGURE 4, $$\theta = 360° - (C_y + A_y) = -C_y - A_y.$$

To determine $\theta$ a synchro differential 50 is electrically connected to connecting lead 33 and is mechanically connected to gear train 45 through a connecting shaft 51. Thus the angles $A_y$ and $C_y$ are negatively summed to provide an output signal from differential 50 on a connecting lead 52 representative of the quantity $\theta$. The expression "negatively summed" is used to indicate that the directions of rotation of shafts 33 and 51 are opposite to those of shafts 31 and 47, so that the actual values put into synchro differential 50 are $-A_y$ and $-C_y$, and that in differential 50 they are added algebraically to give the quantity $-A_y - C_y$, to which $\theta$ is equal.

A synchro control transformer 53 is excited by the signal representative of $\theta$ through connecting lead 52 and this signal is supplied to an amplifier 54 through a connecting lead 55. The signal is amplified in amplifier 54 and used to drive a motor 56 through a connecting lead 57. Motor 56 in turn drives a gear train 60 through a connecting shaft 61 and gear train 60 further drives a shaft 62 connected to the rotor of transformer 53. Gear train 60 also rotates the rotor of a synchro transmitter 63 by a shaft 64. Transmitter 63 is excited by an alternating current source through a connecting lead 65. Therefore, the signal output of transmitter 63, on an output lead 66, is indicative of the angle $\theta$. Motor 56 is also connected to a velocity generator 67 through a common shaft 70; thus velocity generator 67 provides a signal output on a connecting lead 71 which is representative of pitch angular rate or $d\theta/dt$. The circuitry thus described comprises an adjusting means and the associated output means, which accepts a signal from the comparing means, amplifier 40, and adjusts the angle until the signals applied to amplifier 40 are equal.

Returning to FIGURE 7A, accelerometer 12 which produces a signal representative of $a_y$ is connected to an amplifier 72 by a connecting lead 73. Amplifier 72 is connected by a lead 74 to excite one of the stationary windings of a synchro resolver 73 and a second signal is received by the other stationary winding of resolver 73 through a connecting lead 75 from amplifier 17. Thus resolver 73 has input signals representative of $a_y$ and $a_z$ for the accelerations along the Y and Z axes of the craft. Resolver 73 derives from the $a_y$ and $a_z$ signals a pair of output signals which appear on a pair of connecting leads 76 and 77, and operates in the same manner as synchro resolver 18. Signals forming the energization for the tangent solver are sent to an amplifier 80 through a connecting lead 77 and the combined signals representative of the two accelerations generate the angle $A_x$ as shown in FIGURE 2. This is accomplished by connecting a motor 81 to amplifier 80 through a connecting lead 82 and connecting a gear train 83 to motor 81 through a connecting shaft 84. Resolver 73 is connected to gear train 83 by a shaft 85 and thus has its rotor positioned at an angle corresponding to the angle $A_x$ between the Z axis and the resultant of $a_y$ and $a_z$. The combining means consisting of amplifier 80, motor 81, gear train 83 and resolver 73 then supplies a signal indicative of the combined acceleration or $a_{yz}$, which appears on connecting lead 76. As gear train 83 is rotated to a position representative of $A_x$, a synchro transmitter 86 is also oppositely rotated through a connecting shaft 87. Transmitter 86 is energized by an alternating source of voltage through a connecting lead 90 and an output signal is developed representative of the angle $A_x$ on a connecting lead 91.

An amplifier 92 is connected to a synchro resolver 93 by a connecting lead 94 and is excited through connecting lead 76 by the signal representative of $a_{yz}$. Resolver 93 produces an output signal upon a connecting lead 95 and this signal is used to energize a comparing means, which in this preferred embodiment is an amplifier 96. Amplifier 96 has another input which is received on a connecting lead 97 and this signal is indicative of $a_v \cos E$. Any difference in magnitude and direction between these two signals is used to drive a motor 100 through a connecting lead 101. A gear train 102 is connected to motor 100 by a connecting shaft 103 and is connected to the rotor of resolver 93 through a connecting shaft 104. Motor 100 and gear train 102 comprise an adjusting means utilized to adjust the rotor of resolver 93 to the correct position. Thus, motor 100 is driven or rotated until the two inputs to amplifier 96 become equal and the angle $C_x$ is generated such as shown in FIGURE 2.

A synchro differential 105 is electrically connected to connecting lead 91 and is mechanically connected to gear train 102 through a connecting shaft 108.

Thus, the angles $A_x$ and $C_x$ are negatively summed to produce an output on a connecting lead 106 representative of the angle $\phi$.

A synchro control transformer 107 is connected electrically to connecting lead 106 and supplies a signal representative of $\phi$ on a connecting lead 110 to an amplifier 111: the amplified signal is used to energize a motor 112 through a connecting lead 113. Motor 112 drives a gear train 114 through a connecting shaft 115. A synchro transmitter 116 has its rotor connected to gear train 114 through a connecting shaft 117 and is excited from a suitable alternating voltage source through a connecting lead 120. Transmitter 116 provides an output signal on a connecting lead 121 which is indicative of the roll angle $\phi$ of the craft. The rotor of synchro control transformer 107 is also driven by gear train 114 by means of a shaft 109. A velocity generator 122 is connected to motor 112 by a common shaft 123, and the output, which is a rate of change of roll signal or $d\phi/dt$, appears on an output lead 124. Thus, the circuitry described in the previous three paragraphs comprises an adjusting circuit and its output means and adjusts the comparing means, amplifier 96, so that the signals applied are equal. It also applies a signal to a correction circuit, as will be explained, to correct for deviations between the computed angles.

Figure 5:
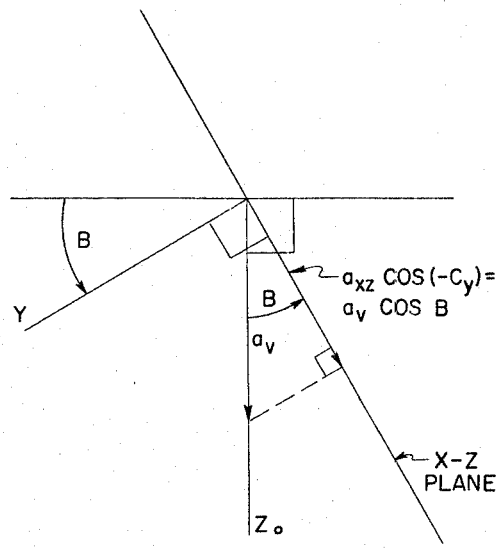

A synchro resolver 125 is connected to gear train 114 through a connecting shaft 126 and this shaft rotates the rotor of the resolver to a position representative of the angle $\phi$. Resolver 125 has an electrical input received through a connecting lead 127 representative of $\cos E$. The output of resolver 125 is $\cos E \sin \phi$, which is equal to $\sin B$, and is sent to an amplifier 130 through a connecting lead 131. The amplifier output is sent to a motor 132 through a connecting lead 133. A gear train 134 is rotated by motor 132 through a connecting shaft 135 and is used to rotate the rotor of a synchro resolver 137 through a shaft 136. Resolver 137 is excited by an alternating voltage source through a connecting lead 138 and has a pair of output signals, one representative of $\sin B$ on a lead 140 which is connected to amplifier 130 and one representative of $\cos B$ on a connecting lead 141 which is used to energize an amplifier 142. Thus it may be seen that motor 132 is driven to a position where the value $\cos E \sin \phi$ is balanced by a signal equal to $\sin B$ of opposite phase, from synchro resolver 137, so that motor 132 is driven to a position representative of the angle B as shown in FIGURES 4 and 5.

A synchro resolver 143 is connected to gear train 60 through shaft 146 and this shaft rotates the rotor of synchro resolver 125 to a position representative of $\theta$. The resolver is energized by a signal representative of $\cos B$ from amplifier 142 through a connecting lead 144 and thus the output of resolver 143 on output lead 145 is $\cos B \sin \theta$, equal to $\sin E$. An amplifier 147 receives an input signal from connecting lead 145 and the amplified signal is sent to a motor 150 through a connecting lead 151. The motor positions a gear train 152 through a connecting shaft 153. Gear train 152 is connected by a connecting shaft 155 to the rotor of a synchro resolver 154 which is electrically excited from an alternating voltage source through a connecting lead 156. Resolver 154 provides a pair of output signals, one representative of $\sin E$ on a connecting lead 157 and the other representative of $\cos E$ on an output lead 160. Connecting lead 157 is connected to amplifier 147 where the first output signal is used to balance the voltage indicative of $\cos B \sin \theta$ so that motor 150 is driven to a position representative of the angle E as found in FIGURES 2 and 3. Connecting leads 160 supplies the $\cos E$ signal to an amplifier 161 which amplifies the signal that is used to excite synchro resolver 125 through connecting lead 127. Thus, any change in roll $\phi$ or pitch $\theta$ is reflected into the opposite computation of the angles E or B which are referenced to the earth coordinate system.

A synchro resolver 162 has its rotor rotated to a position representative of the angle E by a shaft 163 which is connected to gear train 152. In like manner, a synchro resolver 164 has its rotor rotated to a position representative of the angle B by a shaft 165 which is connected to gear train 134. Thus, it can be seen that the correction means described in the two preceding paragraphs compensates for any deviations in the angles B and E applied to synchro resolvers 164 and 162 and obtained from synchro resolvers 125 and 143.

FIGURE 7A shows a second measuring means consisting of a vertical acceleration apparatus 166 which produces a pair of outputs representative of the vertical acceleration $a_v$ of the craft. Resolver 162 of FIGURE 7B is connected to vertical acceleration apparatus 166 by a connecting lead 167 and resolver 164 is connected to vertical acceleration apparatus 166 by a connecting lead 168. Since the rotor of resolver 162 is rotated to a position representative of the angle E a voltage may be obtained which is indicative of the vertical acceleration multiplied by $\cos E$ and this voltage appears on connecting lead 97 and is the voltage which is compared to the voltage representative of the vertical component of the acceleration appearing in the Y–X plane such as seen at the input to amplifier 96. Synchro resolver 164 which has its rotor positioned to a value representative of the angle B provides an output signal which is representative of the vertical acceleration times the cosine of the angle B and this signal appears on connecting lead 44 which is compared to the vertical acceleration component in the X–Z plane at the input to amplifier 40. A transmitter 170 has its rotor connected to gear train 134 by a connecting shaft 171. Transmitter 170 is excited from an alternating voltage source through a connecting lead 172. Therefore an output voltage representative of the angle B is present on an output lead 173. A velocity generator 174 is connected to motor 132 by a common shaft 175 to provide an output signal representative of the rate of change of angle B with respect to time, or $dB/dt$, on a connecting lead 176. A synchro transmitter 177 has its rotor connected to gear train 152 by a connecting shaft 180. Transmitter 177 is excited from an alternating voltage source through a connecting lead 181. Therefore an output representative of the angle E is present on output lead 182. A velocity generator 183 is connected to motor 150 by a common shaft 184 to provide an output signal representative of the rate of change of angle E with respect to time, or $dE/dt$, on a connecting lead 185.

For certain applications it may become difficult to accurately measure the vertical acceleration of the craft, such as the case where a ship is rising and falling due to wave motion. Under these conditions it may become advantageous to use gyroscopes to filter disturbances of short time duration which would be present in the output information. Another case where filters would be advantageous is where the device used to sense the vertical acceleration of the craft has a significant time lag. Several types of gyroscopes may be used for this purpose, however, any gyro unit which has a servo driven gimbal combination capable of performing the functions of stabilization and response to orientation commands may be used. In other words, any gyro that is capable of holding a geometric reference free from rotation with respect to inertial space in the presence of disturbing torques and arbitrary movements of the support member, and one that is capable of changing the orientation of the reference member with respect to inertial space in response to command inputs, may be used. This type of apparatus in shown in FIGURE 6 where it is desirable to filter the angle outputs shown in FIGURE 7B. The type of gyro chosen for providing these two functions is one with a single degree of freedom utilizing rate integrating. One gyroscope is provided for each of the signals $\theta$, B, E, and $\phi$ being brought out as output signals from the computer. A synchro control transformer 186 receives an input signal on an input connecting lead 187 and provides an output representative of the particular angle to be filtered on a connecting lead 190 which is connected to an amplifier 191. A relay 192 comprises an armature 193 and a coil 194. During normal operation a gyro 195 is connected to amplifier 191 through a pair of connecting leads 196 and 197, since movable armature 193 connects lead 196 to lead 197. Gyro 195, as previously stated, is of the rate integrating type and has a torque motor input to rotate the torque axis of the gyro: the opposite end of the axis carries an error pickoff which provides a signal representative of the angle the gyro has rotated through. This error pickoff is connected by a connecting lead 201 to our amplifier 200 where the output signal from the gyro is amplified and sent to a motor 202 by connecting lead 203. Motor 202 is connected to a gear train 204 by a shaft 205 and gear train 204 is connected to the rotor of synchro control transformer 186 by a connecting shaft 206. Gear train 204 is also connected to the gimbal supporting gyro 195 by a connecting shaft 207 which is used to reposition the gimbal. A synchro transmitter 210 which has its rotor connected to gear train 204 by a connecting shaft 211, provides an output signal representative of the filtered input, on an output lead 212. Synchro transmitter 210 is provided with excitation from a suitable alternating voltage source through a connecting lead 213. Since it may be desirable to have a rate of change of these filtered angles, a velocity generator 214 is connected to motor 202 by a connecting shaft 215 to provide an output signal indicative of the rate of change of the input signal with respect to time on an output lead 216.

The vertical acceleration apparatus 166 of FIGURE 7A appears in FIGURE 8 and will now be described. The vertical acceleration is defined as $$a_v = +\ddot{h} - \frac{V_G^2}{R} - 2\Omega V_G \sin A_t \cos L_t + g$$

Where $\ddot{h}$ is the second derivative of the altitude $h$ of this vehicle, or its vertical acceleration, $V_G$ is the ground speed or horizontal velocity of the vehicle in the direction of the X axis, R is the radius of curvature of the earth, $\Omega$ is the angular velocity of the earth, $A_t$ is the ground track angle of the vehicle, $L_t$ the latitude, and $g$ is given by the following equation derived from the international gravity formula and omitting as negligible terms representative of the Potsdam correction and the local gravity anomaly.

$$g = 32.09052 - C_1 H + C_2 \sin^2 L_t - C_3 \sin^2 2L_t \quad (6)$$

Here 32.09052 is the equator value of gravity, $$C_1 = 32.09052 \times 9.6165 \times 10^{-8}$$
$$C_2 = 32.09052 \times 5.2884 \times 10^{-3}$$

and $$C_3 = 32.09052 \times 5.9 \times 10^{-6}$$

For most applications the last term also may be neglected and the value for $g$ would equal 32.09052 $(1 + 5.2884 \times 10^{-3} \sin^2 L_t - 9.6165 \times 10^{-8} h)$. A more comprhensive treatment of the value for gravity $g$ is found in "Geodesy," by Guy Bomford, V. Clarendon Press, 1952.

An altitude responsive device 223 is connected to an amplifier 224 by a connecting lead 225. Altitude responsive device 223 may be any type of altitude and altitude rate producing device and need not be limited to either a pressure sensitive device or radio responsive device. One such altitude responsive device is shown in the Waldhauer Patent 2,793,341 assigned to the assignee of the present application. The signal provided on connecting lead 225 is a rate of change of altitude signal $\dot{h}$ and the amplified signal from amplifier 224 is used to rotate a motor 226 through a connecting lead 227. A velocity generator 230 has its rotor connected to motor 226 by a connecting shaft 231 and a signal representative of the second derivative of altitude $\ddot{h}$, is supplied to one end of a summing resistor 232 by a connecting lead 233. The other end of resistor 232 is connected to an amplifier 234 by a connecting lead 235. A gear train 236 is rotated by motor 226 through a shaft 237 and gear train 236 in turn rotates the wiper arm 240 of potentiometer 241 by a shaft 242. Potentiometer 241 also comprises a resistive element 243 connected to a suitable alternating voltage source which has one terminal grounded. The voltage appearing on wiper arm 240 is sent to amplifier 224 through a connecting lead 244, and the circuit is completed through the ground to amplifier 224, to supply a balance voltage to balance the rate of change of altitude signal.

An altitude signal $h$ is supplied to the resistive element 245 of a potentiometer 246 through a connecting lead 247. The opposite end of resistive element 245 is connected to ground and potentiometer 246 includes a wiper arm 248 which is adjustable manually through a shaft 250 to a value corresponding to the constant $-C_1$. Thus, a signal representative of $-C_1 h$ is connected to one end of a summing resistor 251 through a connecting lead 252. The other end of resistor 251 is connected to lead 235.

A gear train 253 has an input shaft 254 for rotation in accordance with ground velocity $V_G$, and for the specific embodiment shown is driven by a hand crank 255. It is understood that shaft 254 may be driven by any suitable automatic means which would provide a ground velocity to gear train 253. Gear train 253 provides an output signal representative of ground velocity $V_G$ to a plurality of shafts 256, 257, and 258. A potentiometer 260 comprises a wiper arm 261 and a resistive element 262 connected to the alternating voltage source which has one terminal grounded and connected to a common ground lead 263. A voltage appears on wiper arm 261 representative of the rotational position of shaft 256 which is mechanically connected to wiper arm 261. A second potentiometer 264 comprises a wiper arm 265 and a resistive element 266. One end of resistive element 266 is connected to wiper arm 261 by a connecting lead 267 and the other end of resistor element 266 is connected to ground lead 263. Wiper arm 265 is also connected to shaft 256 so that the signal appearing on wiper arm 265 is representative of $V_G^2$. This signal is sent to one end of a resistive element 270 of potentiometer 271 through a connecting lead 272, the other end of resistive element 270 being connected to ground lead 263. The wiper arm 273 of potentiometer 271 is connected to a shaft 274 carrying a knob which is manually operable in accordance with the negative reciprocal of the radius of the earth, $-1/R$. Thus, the voltage appearing on wiper arm 273 is representative of $$-\frac{V_G^2}{R}$$

and this voltage is sent to a summing resistor 275 through a connecting lead 276. The other end of resistor 275 is connected to connecting lead 235.

Another potentiometer 277 comprises a wiper arm 280 and a resistive element 281 connected to the source of alternating voltage which is grounded at one terminal. The wiper arm is connected to a control shaft 282 for manual adjustment to a position which is representative of the equator value for gravity generally known as 32.09052 feet per second per second. This voltage is sent to a summing resistor 283 through a connecting lead 284. The other end of resistor 283 is also connected to lead 235.

Shaft 257 is further shown to be connected to the wiper arm 285 of a potentiometer 286 which also comprises a resistive element 287 which is connected to an alternating voltage source. Thus, the voltage appearing on wiper arm 285 is representative of ground velocity $V_G$ and this voltage is applied to the resistive element 288 of a potentiometer 290 by connecting leads 289 and 299. The wiper arm 291 of potentiometer 290 is connected to a shaft 292 which is manually positioned in accordance with the negative of twice the rotational velocity of the earth, $-2\Omega$. The voltage appearing between wiper arm 291 and connecting lead 299, is sent to the center tapped resistive element 293 of a cosine potentiometer 294 by connecting leads 295 and 298 for the development of the trigonometric function. A gear train 297 is driven by a shaft 300 in accordance with the latitude $L_t$ of the craft and for this particular application is shown to be driven by a hand crank 301. Any other suitable means may also be employed to generate a shaft rotational value of the craft's latitude $L_t$. A signal representative of latitude $L_t$ appears on a pair of shafts 302 and 303 connected to gear train 297. Shaft 302 is used to position the wiper arm 296 of potentiometer 294 so that the voltage appearing between the center tap and wiper arm 296 is representative of $-2\Omega V_G \cos L_t$. This voltage is sent to the center tapped resistive element 304 of a sine potentiometer 305, by connecting leads 306 and 308. Potentiometer 305 also comprises a wiper arm 307 which is adjusted by a connecting shaft 310 and for this specific embodiment by a hand crank 311 which is rotated in accordance with the groundtrack angle of the craft $A_t$. It is also understood that any other suitable means may be employed which may be manual or automatic to control shaft 310 and thus move potentiometer wiper arm 307 in accordance with the heading. The signal appearing on wiper arm 307 is indicative of the quantity $2\Omega V_G \cos L_t \sin A_t$, and is connected to one end of a summing resistor 312 by a connecting lead 313. The other end of resistor 312 is connected to conductor 235.

A sine potentiometer 314 comprises a wiper arm 315 and a center tapped resistive element 316 connected to a suitable source of alternating voltage. Shaft 303 is used to position wiper arm 315 so that the voltage appearing between the wiper arm 315 and lead 323, which is connected to the center tap is representative of $\sin L_t$. A second sine potentiometer 317 comprises a wiper arm 320 and a resistive element 321 which is center tapped to ground. One end of resistive element 321 is connected to wiper arm 315 by a connecting lead 322 and the other end of resistive element 321 is connected to the center tap of resistive element 316 by a connecting lead 323. Wiper arm 320 is also positioned by shaft 302 and therefore the voltage appearing on wiper arm 320 is representative of the quantity $\sin^2 L_t$ and this signal is sent to one end of a resistive element 324 of a potentiometer 325, by a connecting lead 326: the other end of resistive element 324 is connected to ground. Potentiometer 325 also has a wiper arm 327 which is adjustable by a control shaft 330 and is manually positioned to a value of $C_2$. Voltage appearing on wiper arm 327 is then indicative of $C_2 \sin^2 L_t$ and this voltage is sent to a summing resistor 331 through a connecting lead 332. The other end of resistor 331 is connected to lead 235.

Gear train 297 also produces a shaft rotation representative of twice the latitude of the craft or $2L_t$ on a shaft 333 which is connected to the wiper arm 334 of a sine potentiometer 335 and to the wiper arm 336 of a second sine potentiometer 337. Potentiometer 335 also comprises a center tapped resistive element 340 and potentiometer 337 also includes a resistive element 341 which is center tapped to ground. Resistive element 340 is excited by an alternating voltage source and resistor 341 is connected to wiper arm 334 by a connecting lead 342 and to the center tap on resistive element 340 by a connecting lead 343. Therefore, the voltage appearing between wiper arm 336 and ground is representative of the quantity $\sin^2 2L_t$. A potentiometer 344 comprises a wiper arm 345 and a resistive element 346 connected between wiper arm 336 and ground through a connecting lead 347. Wiper arm 345 is positioned by a manually controlled shaft 348 to a value representative of the quantity $-C_3$ and therefore the voltage appearing on wiper arm 345 is indicative of the quantity $-C_3 \sin^2 2L_t$; this voltage is sent to a summing resistor 350 through a connecting lead 351. The voltages are all algebraically summed and added to the input of amplifier 234 through connecting lead 235, and an output signal with respect to ground is obtained on an output lead 352 representative of the vertical acceleration of the craft $a_v$ according to Equations 5 and 6.

In order to take advantage of the stabilization properties of the gyro in those cases where the vertical acceleration of the craft cannot be measured accurately, it becomes desirable to operate an erection cutoff device. The gyro precessional signal cutoff device is useful when the signal representative of $\overset{\circ\circ}{h}$ used in computing $a_v$ is in error. This may be due to the lag of the apparatus which generates the $\overset{\circ\circ}{h}$ signal, and this is especially true during transients of $\overset{\circ\circ}{h}$. An expression for $\overset{\circ\circ}{h}$ may be derived as follows:

$$\overset{\circ}{h} = V_G \sin E \qquad (7)$$

$$\overset{\circ\circ}{h} = \overset{\circ}{V}_G \sin E + \overset{\circ}{E} V_G \cos E \qquad (8)$$

Since error in the $\overset{\circ\circ}{h}$ signal causes error in $\alpha_v$, it is desirable to cut off the gyro precessional signal and rely on the stabilization properties of the gyros to "remember" the earth reference. This device is made up in part by relay 192 shown in FIGURES 6 and 7A. In FIGURE 7A, a connecting lead 217 is connected to the junction of connecting leads 15 and 16 to receive a signal representative of the acceleration $a_x$ along the longitudinal axis of the craft, that is, along the axis parallel to a direction of the vehicle's predominant velocity or acceleration. This signal is sent to a synchro resolver 220, having a rotor connected to gear train 204 by a shaft 221 so that the synchro output signal is equal to $a_x \sin E$, or $\overset{\circ}{V}_g \sin E$. In other words a component of the principal acceleration is computed as the pitch attitude of the craft increases and this forms part of the signal representative of $\overset{\circ\circ}{h}$. This signal is sent from synchro resolver 220 to an amplifier 228 through a first input lead 222. A second signal $\overset{\circ}{E}$, representative of the rate of change of the elevation angle, multiplied by the ground velocity of the craft $V_G$, is resolved about the angle $E$ to provide the second part of the signal representative of $\overset{\circ\circ}{h}$. This signal is created by applying the $dE/dt$ or $\overset{\circ}{E}$ signal appearing on connecting lead 216 to one end of the resistive element 229 of a potentiometer 238, and completing the circuit to velocity generator 214 through a connecting lead 219. The wiper arm 239 of potentiometer 238 is adjusted by an input of ground velocity $V_G$ (FIGURE 8) from gear train 253 through a connecting shaft 258. The signal which appears on wiper arm 239 is representative of $V_G dE/dt$ and is applied to the input of synchro resolver 259 through a connecting lead 249. The rotor of resolver 259 is rotated through the angle E by shaft 221 so that the output signal is representative of $V_G dE/dt$ cos E and is sent to amplifier 228 through a second input lead 269. Amplifier 228 has its output connected to relay coil 194 through a connecting lead 278. Relay coil 194 and armature 193 are selected for a particular sensitivity such that when the voltage from the amplifier 228 reaches a certain magnitude, armature 193 breaks the connection between connecting leads 196 and 197 of FIGURE 6, thus preventing the precessional signal at amplifier 191 from reaching gyro 195.

Operation

In operation, after the attitude of the craft has become known at its initial or starting position the attitude of the craft with respect to this known reference is then obtainable. This is accomplished by accelerometers 10, 11, and 12 supplying the signals representative of accelerations of the craft along the principal axes and this operation will be described by proceeding with the pitch information. Signals from accelerometer 11 along the yaw axis and from accelerometer 10 along the longitudinal axis of the craft are combined in synchro resolver 18 and in doing so generate the angle $A_y$. The combined acceleration $a_{xz}$ is produced as a signal representative of these accelerations and this signal is used to position resolver 36 so that the signal emerging from it is $a_{xz}$ cos $C_y$. In performing the resolving function, motor 42 is driven to a position representative of the angle $C_y$ as found in FIGURE 4 and the angle $\theta$ is determined by negatively adding the angles $A_y$ and $C_y$ in synchro differential 50. It should be noted that the responsive means described herein is simply one method of generating the angle $\theta$ and that many other embodiments may be thought of by one skilled in the art. The signal representative of the angle $\theta$ is used to drive a servo system consisting of motor 56, amplifier 54, control transformer 53, and synchro transmitter 63. Also connected to motor 56 is a velocity generator 67, so that the signals appearing in the pitch channel are representative of pitch angle $\theta$ and pitch rate which is also known as $d\theta/dt$.

In like manner, the roll information is determined by combining the acceleration measured along the pitch axis of the aircraft by accelerometer 12 and combining the acceleration from accelerometer 11 located along the yaw axis of the craft. Synchro resolver 73 combines the two acceleration signals and generates the angle $A_x$ while producing a resultant acceleration $a_{yz}$ which may be found vectorially in FIGURE 2. This signal is used to drive a synchro resolver and as the component is resolved it generates the angle $C_x$ also found in FIGURE 2. Angles $A_x$ and $C_x$ are negatively summed in synchro differential 105 to produce the angle $\phi$ which is generally known as aircraft roll. It should be noted that the responsive means described herein is simply one method of generating the angle $\phi$ and that many other embodiments may be thought of by one skilled in the art. A servo system having synchro control transformer 107 as an input receives the signal representative of $\phi$ and positions a synchro transmitter 116 to provide an output signal representative of $\phi$ and closes the loop by positioning the rotor of synchro control transformer 107 to a null position. A signal representative of roll rate is produced by a velocity generator 122 and this signal appears as an output in the form of $d\phi dt$. Allowing the aircraft to have assumed a particular roll and pitch attitude, so that all three accelerometers are producing signals, an attitude situation exists similar to that shown in FIGURE 1 and therefore the angles E and B represent the roll and pitch of the craft with respect to earth coordinates. Signals representative of these two angles are generated by the compensating mechanism or correction means. Going back to gear train 60, since a signal representative of pitch exists, synchro resolver 143 has its rotor positioned to a value representative of the pitch of the craft and assuming that some small angle B exists, a signal appears at amplifier 147 which is representative of cosine B sine $\theta$. This signal is used to drive motor 150, which acts through gear train 152 to operate synchro resolver 154. At the same time, gear train 152 provides a signal representative of the angle E to synchro resolver 162. At this point one portion of the loop is closed by taking the signal representative of the vertical acceleration $a_v$ from vertical acceleration apparatus 166 and presenting it as an input to synchro resolver 162 so that the output which is $a_v$ cos E is used to balance the $a_{yz}$ cos $C_x$ input to amplifier 96 and thus the loop is driven until the loop settles out at the point where the two quantities just mentioned are equal. Synchro resolver 154 provides a pair of signals, the first $a$ sin E signal which is used at amplifier 147 to balance the other input signal cos B sin $\theta$ which appears at amplifier 147, and the second $a$ cos E signal which is used as an electrical input to resolver 125. Thus the output from resolver 125 is changed and this signal appears on input lead 131 to amplifier 130, and is representative of cos E sin $\phi$, since the angle $\phi$ is already present in synchro resolver 125 due to the rotation of shaft 126. Thus motor 132 is driven to a new position representative of cos E sin $\phi$ which also equals sin B and consequently synchro resolvers 137 and 164 have their rotors positioned in accordance with angle B. Synchro resolver 164 has an electrical input received from vertical acceleration apparatus 166 and the vertical acceleration $a_v$ when resolved through the angle B appears as a signal $a_v$ cos B which is presented as another input to amplifier 40 where the signal is compared with the quantity $a_{xz}$ cos $C_y$ and so the second loop is closed and the system is driven to the point where the two latter mentioned quanties become equal. Synchro resolver 137 utilizes the sin B output to balance the input to amplifier 130 and thus the quantity sin B is made equal to cos E sin $\phi$ in amplifier 130. The other output from synchro resolver 137 which is cos B is sent to synchro resolver 143 where it is resolved about the angle $\theta$ and thus a new signal cos B sin $\theta$ is created which drives the E loop to a new value and hence eventually drives the B loop to a second value. This operation is continued until the angles B and E have attained their proper values. An output signal representative of the angle B is then obtained from synchro transmitter 170 and a signal representative of the rate of change of angle B is obtained from velocity generator 174 and is presented as a $dB/dt$ signal. In like maner, synchro transmitter 177 supplies output signal E, and a rate of change signal is supplied by velocity generator 183, which provides a signal $dE/dt$ representative of the rate of change of angle E.

Figure 6:
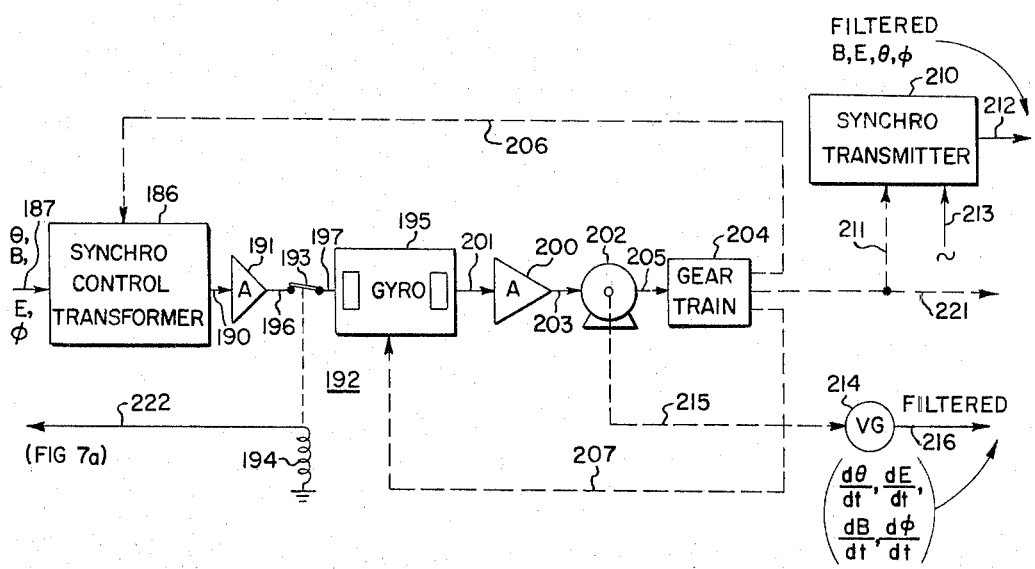
FIGURE 6 is a diagrammatic presentation of a gyro filter network which may be used to filter the outputs of the computer.

In order to provide filtering for the angles brought out from the space coordinate system, space filters are employed such as found in FIGURE 6 which are made up of a gyro loop associated with an erection cutoff system. A loop such as shown in FIGURE 6 is supplied for each of the output signals representative of the four different angles, in order to provide filtered signals for all of the angles produced. The signals representative of the different angles are received by synchro control transformer 186 and the signal after being amplified by amplifier 191 drives a torque motor in gyro 195 thus causing the gyro to be precessed. The precession is sensed by an error pickoff in gyro 195 and this signal is used to drive a motor and gear train 204 such that synchro control transformer 186 is driven to a null position and simultaneously gyro 195 is precessed to a position representative of the null point obtained in synchro control transformer 186. The filtered angles then appear on synchro transmitter 210 as filtered displacement signals and the rate of change of the angle appear as rate signals from velocity generator 214 driven by motor 202. In case the input to gyro 195 should exceed the precessional rate of the gyro, an erection cutoff system is actuated to remove this signal until the spurious type signal disappears and the circuit is completed again. This is accomplished by exciting resolver 220 as shown in FIGURE 7A from an acceleration signal which is predominantly the forward acceleration of the craft, and exciting resolver 259 from a rate of change of elevation signal multiplied by the ground velocity signal and this signal so that the sum of the two signals is a measure of the rate of change of attitude of the craft. When this rate exceeds the precession rate of gyro 195, the voltage from amplifier 228 is used to actuate sensitive relay coil 194 of relay 192 and thus the circuit to the torque motor of gyro 195 is momentarily interrupted. When this spurious change subsides, armature 193 again closes the circuit. During the time when the signal is cut off, the circuit relies on the inherent stability of the gyro to maintain the output signal at a proper value.

The vertical acceleration apparatus produces the vertical acceleration signal $a_v$ and is shown in FIGURE 8. Since the function of this device is to produce a vertical component of acceleration the method of obtaining this acceleration is to subtract from the quantity 32.09052, or add thereto, the known quantities affecting local gravity and thus provide an output signal representative of $a_v$. Altitude responsive device 223 produces a pair of signals representative of the rate of change of altitude and of altitude. The rate of change of altitude signal is differentiated and a rate of change of altitude signal is provided for amplifier 234. A second such quantity to be subtracted from the quantity $g$, is the quantity designated as $-C_1h$ or $-C_1$ multiplied by the altitude which is also presented as input to amplifier 234. The gravity term $g$ is produced by providing a voltage from potentionmeter 277 to amplifier 234 as a positive quantity. Another term which must be subtracted from gravity is the acceleration due to centrifugal force which is created by the horizontal velocity of the craft at the radius of curvature of the surface of the earth. This quantity is developed by obtaining a ground velocity $V_G$ which drives the wiper arms of potentiometers 260 and 264 to produce the quantity $V_G^2$ which is later multiplied by the terms $-1/R$ where R represents the radius of the earth, and the quantity $-V_G^2/R$ is added to the input of amplifier 234. The vertical component of the acceleration caused by the earth's rotation and eastwardly velocity of the craft, generally known as the Coriolis effect must also be subtracted from the gravity term $g$. This is accomplished by first generating the quantity $-2\Omega V_G$, where $\Omega$ is the rate of rotation of the each, by a pair of potentiometers 286 and 290, and this information is used to energize a sin potentiometer 294. Its wiper arm 296, is driven by a mechanical signal representative of the latitude of the craft and the signal which is picked off by wiper arm 296 is $-2\Omega V_G \cos L_t$ which is used to excite a sine potentiometer 305 which has its wiper arm adjusted by the ground track angle of the craft $A_t$. Thus the signal appearing on wiper arm 307 appears as $-2\Omega V_G \cos L_t \sin A_t$ which is also added to the quantity $g$ at the input to amplifier 234. Several other terms are subtracted from the quantity $g$ which are set forth by the international gravity formula as follows. Gear train 297 is rotated to provide the latitude of the craft which may be done manually or automatically and a sine potentiometer which has the wiper arm positioned by the latitude of the craft develops a signal representative of sin $L_t$ which is used to excite a second sine potentiometer 317 which is also adjusted by the quantity $L_t$, and the signal picked off by wiper arm 320 is representative of $\sin^2 L_t$ which is used to excite another potentiometer 325. The wiper arm of potentiometer 325 is adjusted to the constant quantity $C_2$, and therefore the signal which appears on the wiper arm is $C_2 \sin^2 L_t$ which is also sent to the input of amplifier 234 to be added to the quantity 32.09052. Finally, a second quantity, $2L_t$, is generated by gear train 297, and this is used to position the wiper arm of a potentiometer 335 which is also a sine potentiometer. This voltage excites the resistive winding of a second sine potentiometer 337 and thus the voltage picked off by wiper arm 336 is representative of $\sin^2 2L_t$ which is used to excite the resistive element of potentiometer 334. The wiper arm 348 of potentiometer 344 is position by the quantity $-C_3$ which has been previously described and this quantity $-C_3 \sin^2 2Lt$ is also added to the quantity 32.09052 at the input to amplifier 234. After the appropriate corrections have been made to the quantity 32.09052, the signal finally emerging from amplifier 234 is representative of the vertical acceleration of the craft $a_v$ and this is the signal which is used to compare the vertical components of the acceleration in the X-Z and Y-Z planes. For certain applications it may become desirable to eliminate several of the quantities subtracted from the term 32.09052 where a certain sensitivity is not required and these modifications and departures will generally be known to those skilled in the art.

While I have shown and described a specific embodiment of this invention, the invention should not be limited to the particular form shown and I intend in the appended claims to cover all modifications which do not depart from the spirit and scope of this invention.

I claim as my invention:

1. Vertical reference computing apparatus utilizing orthogonal axes located along the pitch, roll, and yaw axes of a dirigible craft, said apparatus comprising:

first measuring means responsive to the acceleration of the craft along the pitch, roll and yaw axes thereof for producing signals indicative of said acceleration;

second measuring means responsive to craft movement along the true vertical axis for producing a signal indicative of the acceleration of said craft along said vertical axis;

computing means responsive to said signals for providing a first set of angular indications determined by the position of the craft's coordinate axes and the earth cordinate axes with respect to a first line defined by the intersection of a plane containing the roll axis and the true vertical with a plane containing the pitch and yaw axes, and a second set of angular indications determined by the position of the craft's coordinate axes and the earth coordinate axes with respect to a second line defined by the intersection of a plane containing the pitch axis and the true vertical axis with a second plane containing the roll and yaw axes, and first and second set of angular indications defining the position of the coordinate system of the craft in relation to the earth coordinate system; and means connecting said first measuring means and said second measuring means to said computing means.

2. Vertical reference computing apparatus utilizing orthogonal axes located along first, second and third axes of a dirigible craft, said apparatus comprising:

first measuring means for measuring the acceleration along each of the axes of the craft;

first combining means for combining the acceleration measured along the first and third axes into a resultant acceleration;

first resolving means for determining the component of the resultant of the first and third accelerations along a first line defined by the intersection of a plane containing the second axis and the true vertical with a plane containing the first and third accelerations;

means for connecting said first combining means to said first measuring means and to said first resolving means;

second combining means for combining the acceleration measured along the second and third axis into a resultant acceleration;

second resolving means for determining the component of the resultant of the second and third acceleration along a second line defined by the intersection of a plane containing the first axis and the true vertical with a plane containing the second and third accelerations;

means for connecting said second combining means to said first measuring means and to said second resolving means;

second measuring means for measuring the vertical acceleration of the craft;

third resolving means for determining the component of the measured vertical acceleration along the first line;

fourth resolving means for determining the component of the measured vertical acceleration along said second line;

means connecting said third resolving means and said fourth resolving means to said second measuring means;

first comparing means for comparing the component of the resultant of the first and third accelerations along said first line to the component of the vertical acceleration along said first line;

second comparing means for comparing the component of the resultant of the second and third accelerations along said second line to the component of the vertical acceleration along said second line;

means connecting said first comparing means to said first resolving means and said third resolving means;

means connecting said second comparing means to said second resolving means and said fourth resolving means;

computing means for adjusting said first and third resolving means until the components applied to said first comparing means are equal and for adjusting said second and third resolving means until the components applied to said second comparing means are equal;

means connecting said computing means to said first, second, third, and fourth resolving means and said first and second comparing means;

means providing signals indicative of the amount said first, second, third, and fourth resolving means are adjusted, said signals being representative of the angular positions of the axes of the craft with respect to a given reference; and means connecting said last named means to said computing means.

3. In combination:

means giving signals representative of the linear acceleration of a vehicle along its roll, pitch, and yaw axes;

means computing from the pitch and yaw acceleration signals the magnitude in their plane of the resultant acceleration and the angle between said resultant acceleration and said yaw acceleration;

means computing from the roll and yaw acceleration signals the magnitude in their plane of the resultant acceleration and the angle between said resultant acceleration and said yaw acceleration;

means giving a further signal representative of the acceleration of the vehicle in a vertical direction;

means computing from said further signal the components thereof in the above named planes;

means computing the angles, in their respective planes, between said resultants and said components, and computing the vertical components, in said planes, of said resultants;

means comparing said components of said further signals with said vertical components of said resultants in pairs in their respective planes, and adjusting the last named angles until the components of said pairs become equal; and means computing from the last named angles and the two first named angles the angular displacement of said pitch and roll axes from the horizontal.

4. Vertical reference computing apparatus utilizing orthogonal axes located along the pitch, roll and yaw axes of a dirigible craft, said apparatus comprising:

first measuring means for measuring the acceleration along each of the axes of the craft;

first combining means for combining the acceleration measured along the pitch and jaw axes into a resultant acceleration;

first resolving means for determining the component of the resultant of the pitch and yaw accelerations along a first line defined by the intersection of a plane containing the roll axis and the true vertical with a plane containing the pitch and yaw axes;

means for connecting said first combining means to said first measuring means and to said first resolving means;

second combining means for combining the acceleration measured along the roll and yaw axis into a resultant acceleration;

second resolving means for determining the component of the resultant of the roll and yaw acceleration along a second line defined by the intersection of a plane containing the pitch axis and the true vertical with a plane containing the roll and yaw axes;

means for connecting said second combining means to said first measuring means and to said second resolving means;

second measuring means for measuring the vertical acceleration of the craft;

third resolving means for determining the component of the measured vertical acceleration along the first line;

fourth resolving means for determining the component of the measured vertical acceleration along said second line;

correction means for correcting the components provided by said third and fourth resolving means when the yaw axis is not aligned with the true vertical;

means connecting said third resolving means and said fourth resolving means to said second measuring means and said correction means;

first comparing means for comparing the component of the resultant acceleration along said first line to the component of the vertical acceleration along said first line;

second comparing means for comparing the component of the resultant acceleration along said second line to the component of the vertical acceleration along said second line;

means for producing output information representative of the angular positions of the axes of the craft with respect to a given reference;

means connecting said first comparing means to said first resolving means and said third resolving means;

means connecting said second comparing means to said second resolving means and said fourth resolving means;

first adjusting means for adjusting said first resolving means to a position where the components of the accelerations compared by said first comparing means are equal;

connecting means connecting said first adjusting means to said first comparing means and to said means for producing output information, said connecting means including further means for connecting said first adjusting means to said first combining means and to said correction means;

second adjusting means for adjusting said second resolving means to a position where the components of the accelerations compared by said second comparing means are equal;

connecting means connecting said second adjusting means to said second comparing means and to said means for producing output information, said connecting means including further means for connecting said second adjusting means to said second combining means and to said correction means.

References Cited by the Examiner

UNITED STATES PATENTS

| | | | |
|---|---|---|---|
| 2,873,074 | 2/1959 | Harris et al. | 244—14 |
| 2,946,539 | 7/1960 | Fischel | 73—178 X |
| 3,078,333 | 4/1963 | Newell | 73—178 |

LOUIS R. PRINCE, *Primary Examiner.*

D. O. WOODIEL, *Assistant Examiner.*